CIRCUIT-INTERRUPTING DEVICES USING ACTIVATED CARBON

Filed Oct. 22, 1965 6 Sheets-Sheet 1

WITNESSES
Theodore F. Wrobel
James F. Young

INVENTORS
Daniel Berg
& Thomas W. Dakin
BY
Willard R. Crout
ATTORNEY

CIRCUIT-INTERRUPTING DEVICES USING ACTIVATED CARBON

Sept. 23, 1969 D. BERG ET AL 3,469,047

CIRCUIT-INTERRUPTING DEVICES USING ACTIVATED CARBON

Filed Oct. 22, 1965 6 Sheets-Sheet 3

Sept. 23, 1969 D. BERG ET AL 3,469,047

CIRCUIT-INTERRUPTING DEVICES USING ACTIVATED CARBON

Filed Oct. 22, 1965 6 Sheets-Sheet 5

CIRCUIT-INTERRUPTING DEVICES USING ACTIVATED CARBON

Filed Oct. 22, 1965 6 Sheets-Sheet 6

3,469,047

CIRCUIT-INTERRUPTING DEVICES USING ACTIVATED CARBON

Daniel Berg, Pittsburgh, and Thomas W. Dakin, Murrysville, Pa., assignors to Westinghouse Electric Corporation, Pittsburgh, Pa., a corporation of Pennsylvania Filed Oct. 22, 1965, Ser. No. 501,180
Int. Cl. H01h 9/30, 33/76
U.S. Cl. 200—144 15 Claims

ABSTRACT OF THE DISCLOSURE

Circuit-interrupting devices of various types, such as fuse structures, circuit breakers, lightning arresters, etc. use activated carbon for generating an arc-extinguishing gas. The activated carbon may actually carry a portion of the series current during the opening operation of the device, or it may merely be placed in close proximity to the region of contact separation.

The generation of heat caused, either by current flow through the activated carbon, or by the placing of the activated carbon in close proximity to the arcing region, causes an arc-extinguishing gas to be evolved or desorbed from the pores of the activated carbon. This evolved or desorbed gas is directed into the arc to effect circuit interruption. After circut interruption, the activated carbon cools and readsorbs gas, which may be subsequently used for a later interruption.

In the fuse structure, the load current may be constantly passed through activated carbon and the contacts may be pressure-operated and responsive to the quantity of gas evolved from the activated carbon, which, in turn, is a function of the magnitude of current flow through the fuse structure.

This invention relates, generally, to circuit-interrupting devices, such as lightning arresters, circuit interrupters, fuse structures, etc., and, more particularly, to the use of activated carbon in such devices having adsorbed in the pores of the activated carbon suitable arc-extinguishing gases, which may be given off by the heat generated in passing electrical current through such activated carbon, or otherwise heating the same, for circuit-interrupting purposes.

A general object of the present invention is the provision of an improved circuit-interrupting device utilizing the adsorption characteristics of activated carbon for adsorbing suitable arc-extinguishing gases within the pore structure thereof, and subsequently, employing the evolved gas, given off upon heating the activated carbon, for extinguishing arcs within circuit-interrupting structures.

Although many suitable arc-extinguishing gases are capable of use in applications of the present invention, as brought out hereinafter, particularly desirable and highly-effective performance is obtained by utilizing electro-negative gases, such as sulfur-hexafluoride ($SF_6$) gas, selenium-hexafluoride ($SeF_6$) gas, trifluoromethyl sulfur pentafluoride ($CF_3SF_5$) gas, for example, as the arc-extinguishing gases.

A further object of the present invention is the provision of an improved lightning-arrester device utilizing activated carbon as a structural component part thereof, the activated carbon having adsorbed in the pore structure thereof a suitable arc-extinguishing gas, which may be given off from the activated carbon under the heat of current passage therethrough during discharge of the lightning-arrester device.

Still a further object of the present invention is the provision of improved circuit interrupters utilizing as a component part of the structure thereof activated carbon having previously been treated to adsorb a suitable arc-extinguishing gas in the pore structure thereof.

Still a further object of the present invention is the provision of an improved load-break disconnecting switch having as the interrupting element associated therewith a substantially enclosed structure having an activated carbon cartridge, which has been treated to adsorb a suitable arc-extinguishing gas, which gas will be given off by the heat of current passage through the cartridge, and which gas will be re-adsorbed by the cartridge following a circuit-opening operation.

Still a further object of the present invention is the provision of an improved circuit-interrupting device in which the utilization of activated carbon as a component part thereof, having adsorbed within the pore structure thereof a suitable arc-extinguishing gas, results in the utilization of such evolved gas for arc-extinguishing purposes. Preferably, the interrupting structure is so arranged as to bypass the current around the activated carbon in the closed-circuit position of the device, and thereby only bring the activated carbon into series circuit for desirable gas-evolving purposes during the operation of the interrupting device.

The term "activated carbon" as employed in the specification and in the appended claims means a carbon, mostly of vegetable origin, and of high adsorptive capacity, as set forth in Bennett's Concise Chemical and Technical Dictionary (1947), edited by the Chemical Publishing Company of New York. In this connection, reference may also be made, concerning the activation process, to Industrial Carbon by Mantell, 2nd ed., D. Van Nostrand Co., Inc. (1946), and to Active Carbon the Modern Purifier by John W. Hassler (1941) Industrial Chemical Sales Division of West Virginia Pulp and Paper Company. Further reference may be made to Textbook of Physical Chemistry by Glasstone, 2nd ed. (1946) D. Van Nostrand Co., Inc., New York.

Also, two books by John W. Hassler entitled "Activated Carbon," one copyrighted 1951 and the other 1963, are of value in describing activation processes.

Generally, the present invention utilizes activated carbon for the adsorptive material for a suitable arc-extinguishing gas, preferably an electro-negative gas, such as $SF_6$, $SeF_6$, $CF_3SF_5$, for example. Such treated activated carbon is used as a structural component of a circuit interrupting device, such as a lightning arrester, circuit interrupter, load-break disconnecting switch, fuse structure, or similar type device. Such typical circuit-interrupting devices function to cause a portion of the series current to pass through the treated activated carbon heating the same to cause thereby the evolution therefrom of a portion of the adsorbed gas. This desorbed gas is directed into suitable passages, and effectively utilized to bring about arc extinction in such interrupting structures.

Further objects and advantages will readily become apparent upon reading the following specification, taken in conjunction with the drawings, in which.

Figure 8:
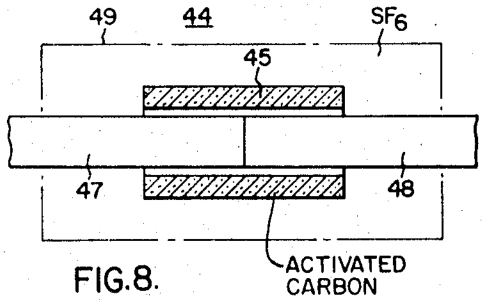
FIG. 8 is a vertical sectional view of a modified-type of circuit-interrupting device illustrating the same in the closed-circuit position.
Figure 9:
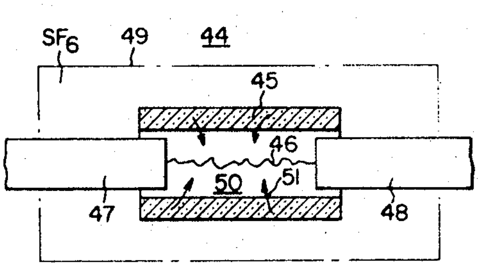
FIG. 9 is a view similar to FIG. 8, but illustrating the circuit-interrupting device at a subsequent time, when the contact structure has separated.
Figure 9A:
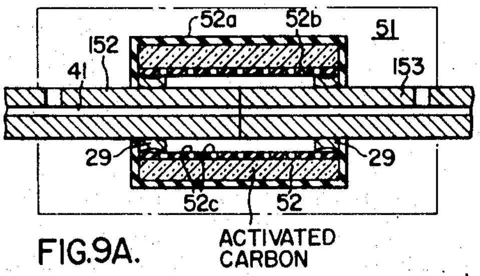
Figure 9B:
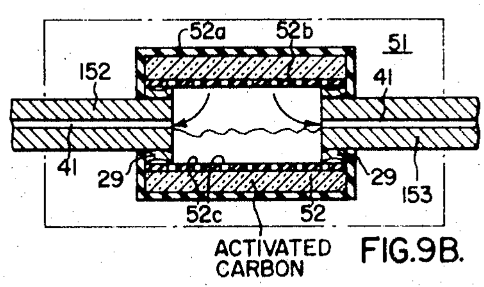
Figure 10:
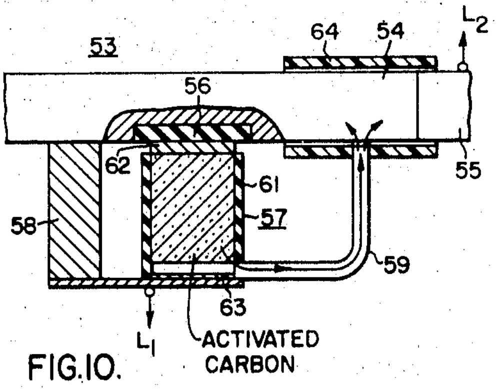
Figure 11:
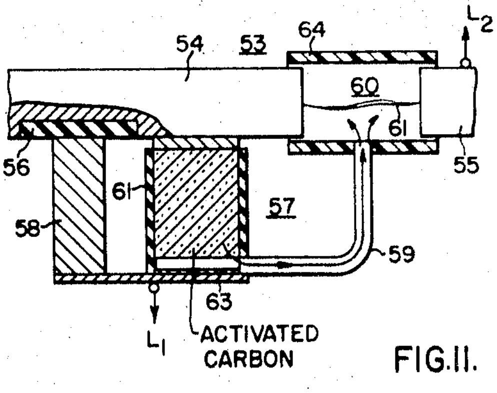
Figure 12:
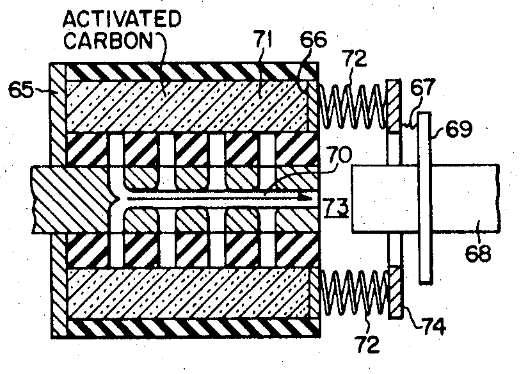
Figure 13:
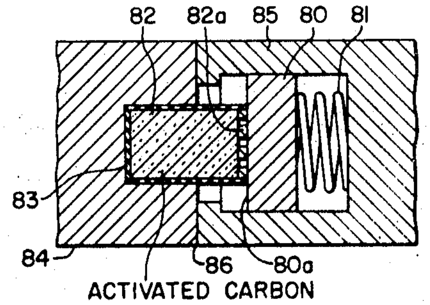
Figure 14:
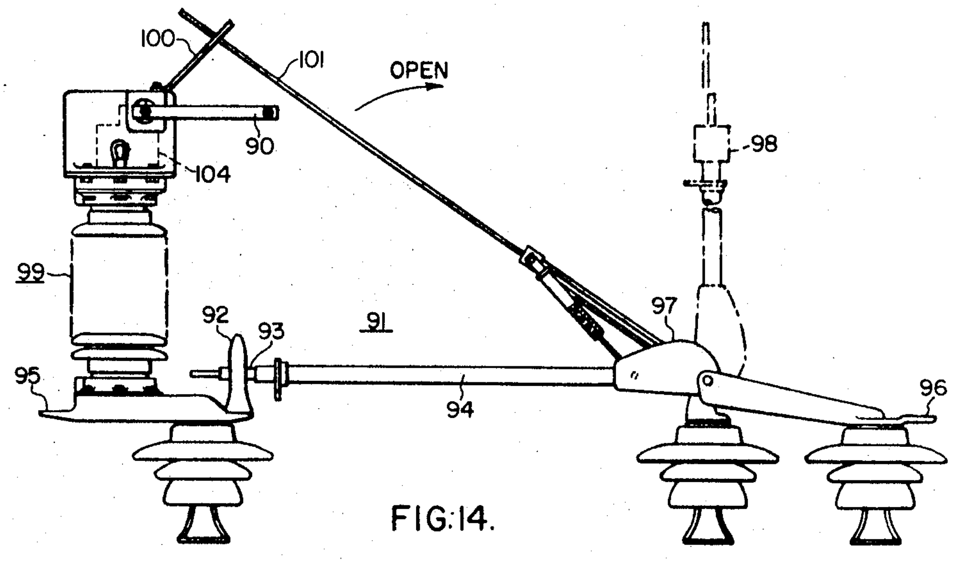
Figures 15, 16:
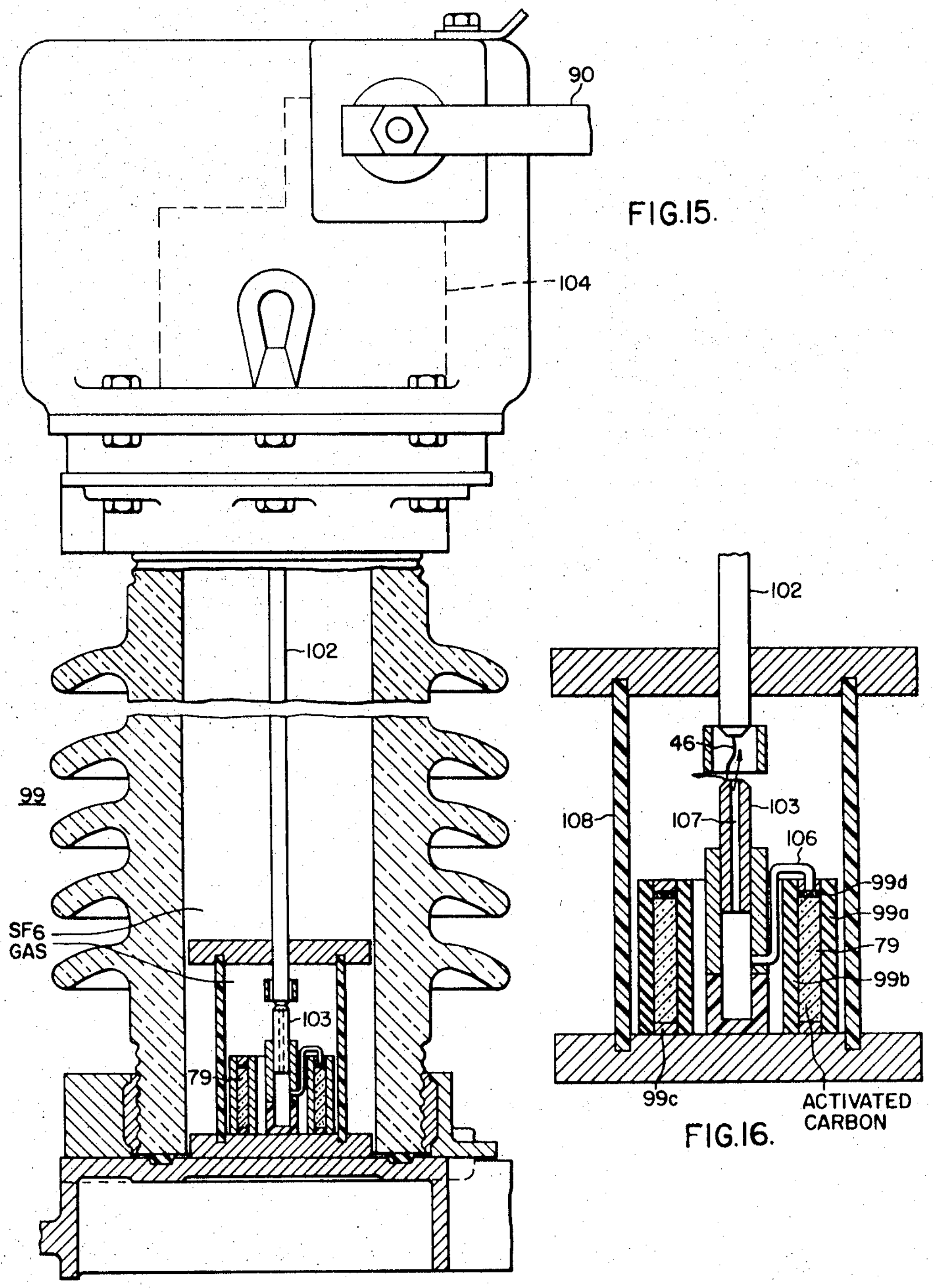
Figure 17:
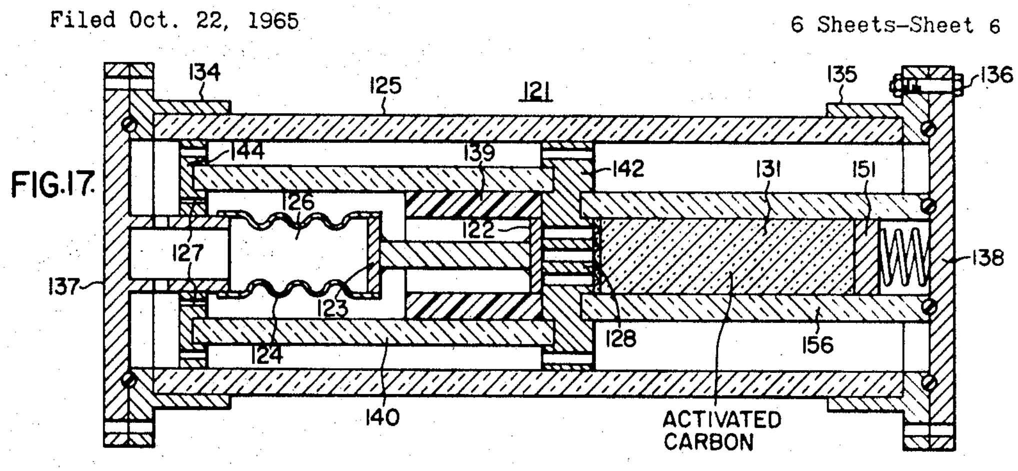

FIGS. 9A and 9B, respectively, illustrate, in vertical section, closed and open positions of a modified-type circuit-interrupting device, similar to the device of FIGS. 8 and 9;

FIGS. 10 and 11 show a further form of circuit-interrupting device utilizing activated carbon with the separable contacts in two different operating positions;

FIG. 12 illustrates a further form of contact structure operable to short out the activated carbon in the closed-circuit position of the device;

FIG. 13 illustrates another form of contact structure for a circuit interrupter, in which the activated carbon is shorted out of the circuit in the close-circuit position of the device;

FIG. 14 illustrates an application of the present invention to a commercial-type load-break disconnecting switch;

FIG. 15 is a vertical sectional view taken through the interrupting assembly of the load-break disconnecting switch of FIG. 14, the contact structure being illustrated in the closed-circuit position;

FIG. 16 is an enlarged vertical sectional view taken through the interrupting element of the interrupting assembly of FIG. 15, the contact structure being illustrated at an intermediate point in the opening operation;

FIG. 17 illustrates a further type of circuit-interrupting structure utilizing activated carbon not only as the extinguishing element, but also as the contact-separating means, the contact structure being illustrated in the closed-circuit position.

Figure 20:
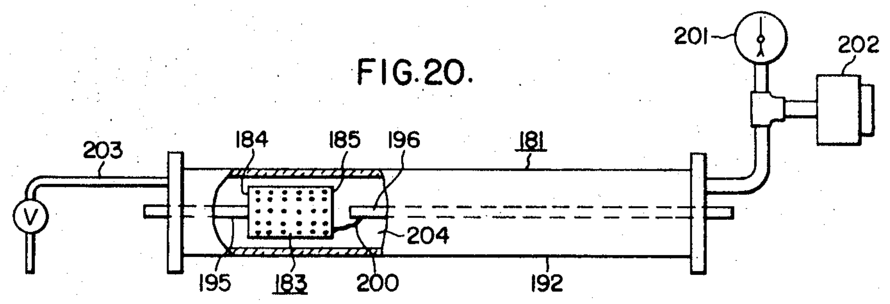
Figure 21:
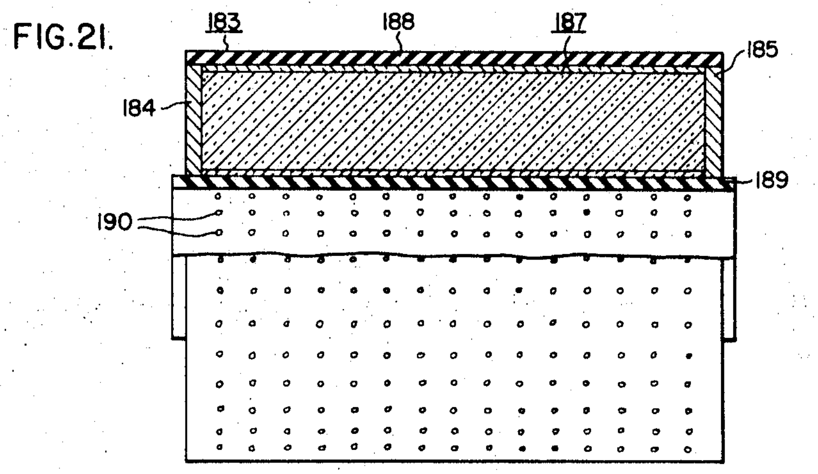
Figure 18:
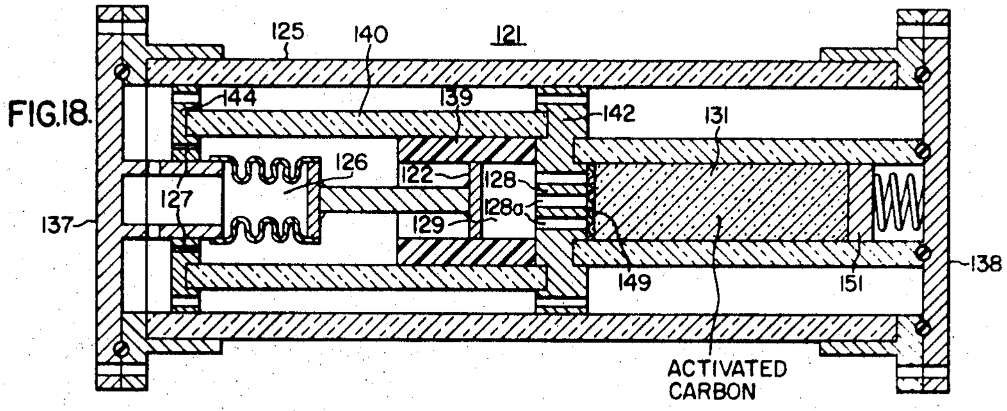
Figure 19:
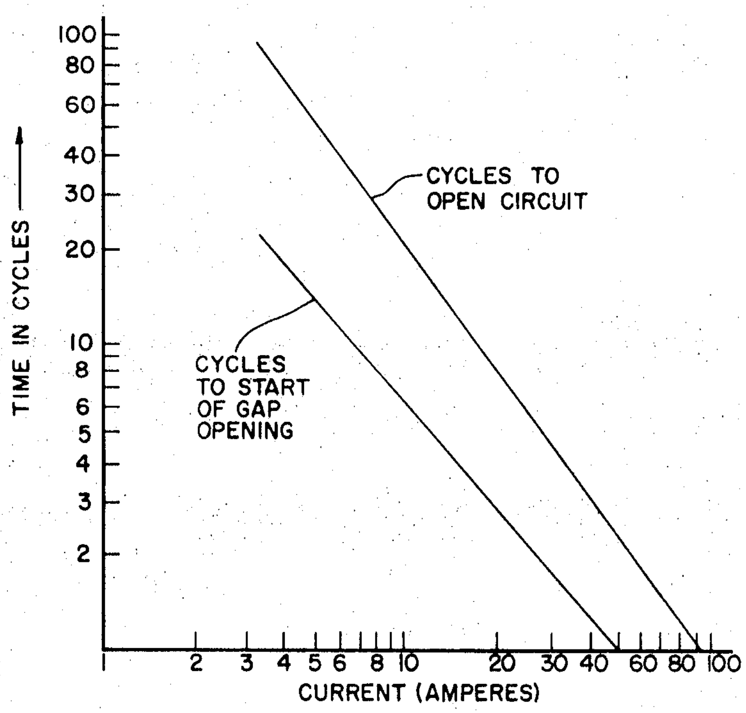

FIG. 18 illustrates the open-circuit position of the interrupter of FIG. 17;

FIG. 19 is a graph of the interrupting performance of the circuit interrupter of FIG. 17;

FIG. 20 is a somewhat diagrammatic view of an experimental test setup for measuring the amount of evolved adsorbed gas as a function of the current carried by the activated carbon; and, FIG. 21 is an enlarged side elevational view, partially in vertical section of the activated-carbon cartridge of the experimental setup of FIG. 20.

Activated carbon is generally made by carbonizing to charcoal a natural cellulosic material like coconut shell. The charcoal is then activated by steaming, or oxidizing the charcoal with air, chlorine, or zinc chloride. This process apparently opens up closed pores in the carbon structure and gives the activated carbon enormous surface area. The enormous surface area permits large weights of materials to be adsorbed on small weights of activated carbon. The size of the pores has been shown to be approximately 20 A., or larger. At the present time, all commercially-available activated carbon has pore-opening size of such dimensions that any electro-negative gas, and other arc-extinguishing gases, will be readily adsorbed by the activated carbon.

The amount of material that is adsorbed depends upon the temperature and pressure of the system. The higher the temperature, the lower the amount adsorbed, and the higher the pressure, the greater the amount of gas adsorbed. Also, in comparing different molecules at the same pressure and temperature, the higher the critical temperature, the greater the amount adsorbed. The latter is qualitatively understood when it is remembered that above the critical temperature, a gas cannot be liquified no matter what the pressure. The critical temperature is a measure of the interaction between molecules, the higher the critical temperature, the greater the interaction. For a molecule to be adsorbed on a surface, it must interact with that surface. The critical temperature is a rough measure of this interaction.

It has been found that activated carbon will adsorb about 40% of its weight of $SF_6$ gas when the temperature is 25° C. and the pressure of $SF_6$ gas is one atmosprere. On heating to about 125° C., almost none of the $SF_6$ gas remains adsorbed. On cooling, the desorbed $SF_6$ gas is readsorbed. Pressures slightly greater than one atmosphere (say 2–4 atmospheres) will not cause any appreciably greater amount of $SF_6$ to be adsorbed—the surface of the activated carbon is saturated. The amount of $SF_6$ gas adsorbed, expressed in a volume sense, is quite large. A hundred grams of powdered activated carbon occupies roughly 200 cc. It can adsorb about 40 grams of $SF_6$ gas, or about 6000 cc. of $SF_6$ gas at one atmosphere. Expressed differently, the activated carbon adsorbs an amount of $SF_6$ gas in a volume equivalent to compressing the $SF_6$ gas to 30 atmospreres (or about 450 p.s.i.a.). As a liquid at 25° C., with a vapor pressure of 375 p.s.i., 40 grams of $SF_6$ liquefied gas occupies 30 cc.

On adsorbing the $SF_6$ gas, the carbon becomes warm; on desorbing, it cools. Roughly, 5,000 calories of heat are taken up, or given off, for each 150 grams of $SF_6$ gas desorbed or adsorbed (or 33 calories per gram of $SF_6$ gas).

The activated carbon is a conductor of electricity. In blocks made by binding with 20% phenolic resin, the resistivity is about 20 ohm-centimeters. This can be varied depending upon the percent carbon used, and the pressure of molding and particle size.

It has been discovered that the foregoing properties of activated carbon of adsorbing $SF_6$ gas, desorbing the gas on heating, and electrical conduction are extremely valuable in circuit-interrupting devices, such as lightning arresters, switchgear, circuit breakers, fuse devices, etc., in which applications the $SF_6$ gas can be held by the activated carbon and released at the proper times to extinguish the drawn arcs.

It is to be clearly understood that the present invention is not limited to the use solely of electro-negative gases, such as $SF_6$, $SeF_6$, and $CF_3SF_5$, for example. The present invention is also suitable for use with other arc-extinguishing gases, such as water vapor, $C_8F_{16}O$, sulfur dioxide ($SO_2$), the various Freons, such as $CCl_2F_2$, the only qualification being that such gases are good arc-extinguishing gases. All gases are, to some extent, adsorbed by the activated carbon. Those gases having a boiling point above −60° C. are particularly suitable. As mentioned, particularly outstanding and extremely effective structures may be fabricated using electro-negative gases, such as $SF_6$, $SeF_6$, $CF_3SF_5$, for example, as the adsorbed gas. However, it will be obvious to those skilled in the art that the invention is applicable to any suitable arc-extinguishing gas, which is sufficiently adsorbed on the carbon.

Figure 1:
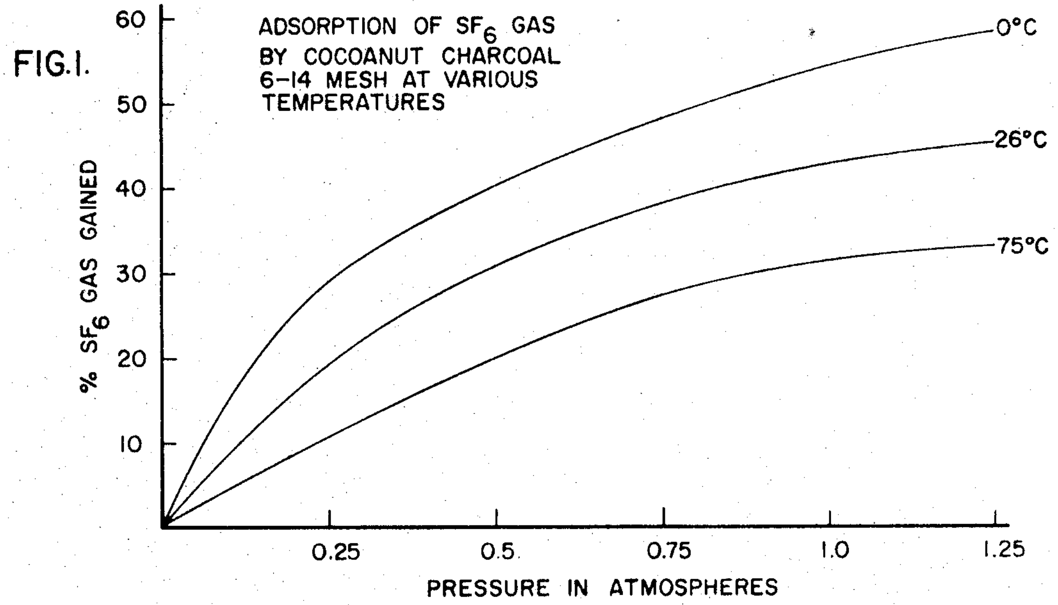
FIGURE 1 is a graph of the pressure versus percentage of $SF_6$ adsorbed by a suitable activated carbon material at various temperatures.

It has been discovered that activated carbon (in particular National Carbon resin-bonded activated wafers and activated coconut carbon, although it is believed this is true for all activated carbon) adsorbs about 35% of $SF_6$ gas, by weight, when the temperature of the carbon is 25° C. and the pressure of $SF_6$ gas above the carbon is about one atmosphere. The adsorbed $SF_6$ gas readily comes off the activated carbon when the carbon is heated to about 300° C. The activated carbon adsorbs the $SF_6$ gas because of its pores, which permit the $SF_6$ gas to enter, and because of the large surface area which the activated carbon exposes to the gas. FIG. 1 of the drawing shows a graph of curves of the pressure versus percentage of $SF_6$ adsorbed by coconut charcoal of 6–14 mesh at various temperatures.

It has been discovered that various designs of arc interrupters, specifically circuit breakers, lightning arresters, fuse structures, etc. may be constructed utilizing the activated carbon with the foregoing properties.

The present invention may readily be applied to the operation of a lightning arrester. In general, a lightning arrester protects the equipment to which it is connected by shorting the lightning impulse to ground through a spark gap. It is necessary that the spark gap recover its insulating properties after the lightning impulse has passed, to interrupt the 60-cycle current which follows.

Several properties are desirable in a lightning arrester. Among them is an impulse ratio less than one. That is, it is desirable for the arrester gap to break down at a lower impulse voltage than the 60 cycle voltage.

Figure 2:
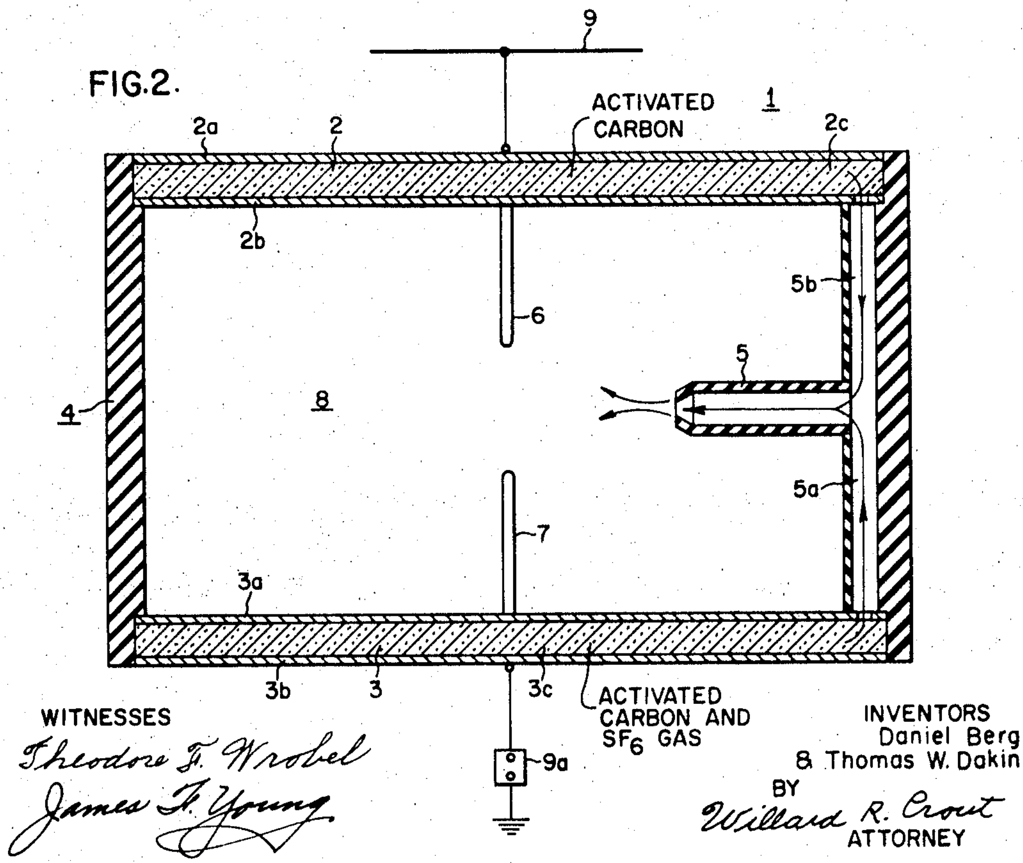
FIG. 2 illustrates an application of the activated carbon to one form of lightning arrester.

FIG. 2 illustrates a lightning arrester 1 utilizing essentially a non-uniform field gap in $SF_6$ gas. It has been found in tests of non-uniform fields in $SF_6$ gas that over a large pressure range, the positive impulse value is less than the 60-cycle crest value. For example, with electrodes consisting of a $\frac{1}{16}$-inch diameter point to plane and a 1 inch gap, the positive impulse value is almost constant and less than the A-C crest value from ½ to over 4 atmospheres of $SF_6$ gas. In series with the gap, there is provided two activated carbon blocks 2, 3, or powder mass, each, for example, being about 6 inches in diameter and ¼-inch thick. The resistance of each block 2, 3, or powder mass, could be about ⅛ ohm, or a total series resistance of ¼ ohm. The volume of each of the blocks 2, 3 is about 100 cc., for example, and each would weigh about 50 grams. The total volume of 200 cc. would contain about 25 grams of $SF_6$ gas, or almost 4 liters of $SF_6$ gas at S.T.P. In this system with a total volume for gas of 0.8 liter it would lead to a pressure rise of about 5 atmospheres of $SF_6$ gas. The heat to drive off the $SF_6$ gas could be obtained from an A-C power follow current. For example, if it is assumed $5\times10^3$ amperes flow, the heat dissipated in 0.01 second (about one-half cycle) in the carbon is:

$$I^2Rt=25\times10^6\times\tfrac{1}{4}\times10^{-2}\ \text{watt-sec.}=6\times10^4\ \text{joules}\cong1.5\times10^4\ \text{calories}$$

The heat capacity of carbon is approximately ½ cal./degree-gram so, for approximately 100 grams, this leads to a temperature rise of 300° C., which is much more than sufficient to remove all the $SF_6$ gas.

The $SF_6$ gas would be forced through a nozzle 5 into the arc between the electrode gaps 6, 7 to extinguish the arc. The voltage drop across the carbon discs 2, 3 when the current was $5\times10^3$ amperes would be 625 volts.

Preferably, the lightning arrester 1 includes a housing 4. The activated carbon discs 2, 3 abut metallic plates **2*a*, 2*b*, 3*a*, 3*b*, as shown. The insulating tubular casing 4 forms, in conjunction with the electrode plates 2*b*, 3*a*, a discharge chamber 8, into which $SF_6$ gas may be injected from the nozzle 5, as indicated by the arrows. Passageways 5*a*, 5*b* provide communication between the nozzle 5 and the spaces 2*c*, 3*c*** within the activated carbon.

In use, the gap assembly of FIG. 2, or a plurality of such assemblies disposed in a series stack, are connected in series to a line conductor 9 at high voltage and a lightning arrester valve element, or resistance element **9*a*, which is connected to ground. Any suitable or usual construction and arrangement of the complete arrester 1** may, of course, be utilized.

Figure 3:
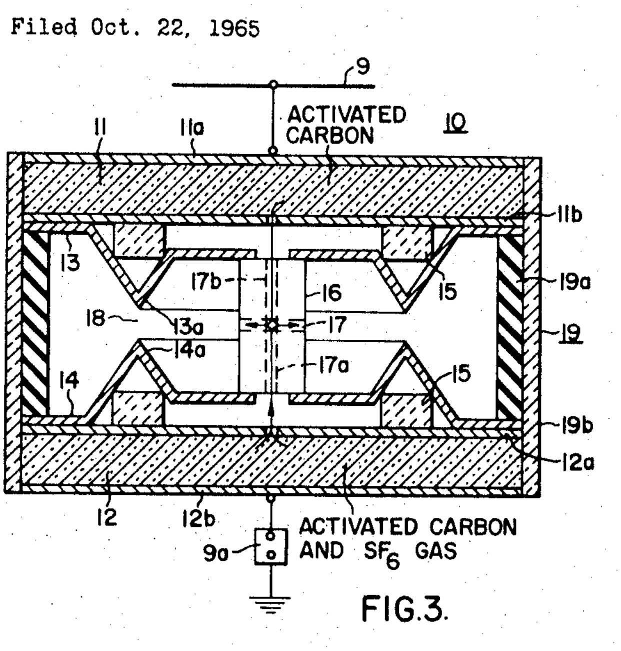
FIG. 3 illustrates another form of lightning arrester utilizing activated carbon as the arc-extinguishing agent.

A modification of a lightning-arrester construction is set forth in FIG. 3 of the drawings. Such a construction is somewhat similar to that set forth and claimed in U.S. Patent 2,985,788 issued May 23, 1961, to Alert N. Opsahl and Tom L. Dyer, Jr., and assigned to the assignee of the instant application.

As shown in FIG. 3, the modified-type lightning arrester 10, includes a pair of cartridge plates 11, 12 of activated carbon. A pair of formed electrode plates 13, 14 are provided having formed upstanding annular ridges **13*a*, 14*a* confronting each other to provide an annular sparking area 18. A radial-field ceramic magnet 15 is provided back of each electrode plate 13, 14 to cause a spinning of the established arc during arrester operation to more quickly effect its extinction. A rutile ceramic spacer 16 having passages 17, 17*a*, 17*b* is provided to effectively direct the evolved $SF_6$ gas from the activated carbon into the arc gap. Thus, use is made of the rutile ceramic preionization buttons and also radial field magnets in back of the electrode plates 13, 14 to quickly extinguish the established arc during arrester discharge. Reference may be made to U.S. Dyer Patent 2,565,125, issued Aug. 21, 1951, for the theory of operation of the preionizing rutile ceramic button 16**.

As shown in FIG. 3, the modified-type lightning arrester 10 includes a housing 19 comprising a tubular rutile ceramic casing **19*a* surrounded by a cylindrical weatherproof casing 19*b*. The casing 19*b* is preferably formed from a suitable weatherproof material, such as porcelain. Metallic end plates 11*a*, 11*b*, 12*a*, 12*b* formed of, say brass, for example, may be associated with the activated carbon mass 11, 12** similar to the construction of FIG. 2.

For a multiple-gap assembly for the higher voltages, instead of using the rutile ceramic casing **19*a***, a resistance material could be employed to divide the impressed voltage somewhat uniformly between the several gap assemblies.

As in the FIG. 2 construction, during arrester operation, $SF_6$ gas is evolved from the activated carbon mass 11, 12, which passes through the passageways **17*a*, 17*b* and laterally into the interelectrode region 18 through the bore 17. The discharge arc is whirled around the annular spark gap 18 by the radial-field magnets 15 while being subjected to the lateral blast of $SF_6$ gas through the holes 17**. As a result, arc extinction quickly occurs.

Since the gas must be evolved from the carbon adsorbent 11, 12 in a small interval of time, it will be necessary and desirable to arrange the carbon in thin sections, or with a number of the holes through it to reduce the resistance to flow out of the carbon mass 11, 12.

It has been determined experimentally that most of the $SF_6$ gas can be expelled from blocks of carbon (about 10 gms. with a resistance of ⅓ ohm) in a period of 15 cycles (of 60 cycle current) with a current of about 300 amperes. In these experiments, the pressure of $SF_6$ gas rose approximately linearly in proportion to the electric heat input until all the $SF_6$ gas was desorbed. Therefore, the time of heating and gas evolution required to desorb the $SF_6$ gas can be reduced to less than a cycle. Thus, sufficient $SF_6$ gas pressure and gas flow can be generated to extinguish an arc in less than a cycle.

These experiments have also confirmed that the $SF_6$ gas will be readsorbed on the carbon 11, 12 as soon as the carbon mass cools. In the particular situation of the test which was made, most of the $SF_6$ gas was readsorbed gradually over a period of 5 to 10 minutes. In this case, 10 grams, in the form of small blocks, were arranged between thin brass plates. After the $SF_6$ gas is readsorbed, the device is ready for a second operation. Repeated operations have been made with no significant change in the operating characteristics. Furthermore, it was determined that an excessive overcurrent, which heated the carbon mass to red heat, did not impair the adsorption properties of the carbon. It is felt desirable, however, to limit the current which would cause overheating and gas decomposition and possible resistance changes as a result of physical derangement of the carbon mass. Current limitation could be provided, if needed, by a silicon carbide resistor 9*a* in series with the device, or other means. Using silicon carbide in series with the adsorbent carbon would also make use of the desirable arrester properties of the silicon carbide.

Mixtures of $SF_6$ and other gases can be used in such a lightning arrester device as this, to make desirable modifications in the breakdown characteristics of the gap, which, is used in series with the carbon resistor from which the $SF_6$ is expelled. For example, nitrogen, helium, carbon tetrafluoride, argon and similar low-boiling-point gases are all adsorbed very little by the carbon at room temperature. Thus, a mixture of one of these gases can be made with $SF_6$ gas up to about 50 molar percent in the gas at 1 atm. pressure in equilibrium with the carbon, without substantial (less than 20%) reduction in the amount of $SF_6$ gas adsorbed on the carbon, which is available for arc-extinguishing.

Figure 4:
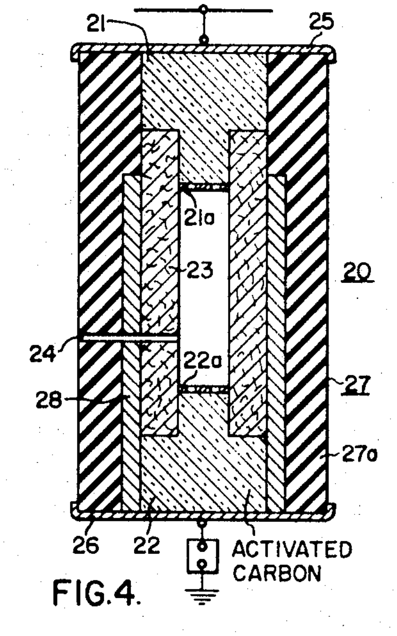
FIG. 4 illustrates a further form of expulsion-type lightning arrester utilizing activated carbon as a structural component thereof.

Another lightning-arrester construction of a different type is illustrated in FIG. 4 of the drawings. It is essentially a modification of the expulsion-type arrester, the theory of which is set forth in U.S. Patent 2,677,072, issued Apr. 27, 1954, to E. J. DeVal, and assigned to the assignee of the instant application. The modified-type lightning arrester 20 of FIG. 4 includes activated carbon end pieces 21, 22, a cellulosic fiber liner 23, and a gas vent 24. Preferably end plates 25, 26 of a suitable metal, such as steel, are additionally provided.

In the expulsion-type lightning arrester 20 of FIG. 4, preferably a housing 27 comprising an insulating tube **27*a* surrounds the cellulosic fiber liner 23. Metallic perforated electrode plates 21*a*, 22*a* are associated with the activated carbon masses 21, 22 respectively, and assume the arcing during discharge of the arrester 20. A conducting shield and reinforcing member 28 is disposed interiorly of the outer insulating casing 27*a*. The theory of use of the shield 28** is set forth in the aforesaid U.S. Patent 2,677,072.

In the expulsion-type arrester 20, such as shown in FIG. 4 of the drawings, the arc decomposes the cellulose fiber liner 23, and the gases produced escape with a high velocity through a small hole 24. The escaping gases serve to extinguish the arc. In the proposed modification of FIG. 4, the end electrodes are essentially activated carbon, which adsorbs water vapor to a large extent, even at very low relative humidities, (5% at 20% relative humidity, and over 50%, by weight, at 50% relative humidity). On arcing between the electrodes, the water is desorbed and flows into the arc area through the electrode perforations and would help put out the arc. After the arc is extinguished, the water would be readsorbed. The amount of water held is enormous when it is considered that under conditions of a 50% relative humidity, a piece four inches in diameter and one-half inch thick, with a volume of 80 cc., holds about 25,000 cc. of water vapor at S.T.P.

The invention is readily applicable, as pointed out previously, to circuit-interrupter constructions. A particularly advantageous construction utilizes the activated carbon and an electro-negative gas, such as $SF_6$ gas, for example. Normally, the activated carbon would not be used as the actual current carrier when the circuit breaker is in the closed-circuit position because it should not be heated prior to operation. However, it is very easy to devise ways in which the current of the arc is passed through the actviated carbon, which contains the $SF_6$ gas when the circuit is opened.

Figure 5:
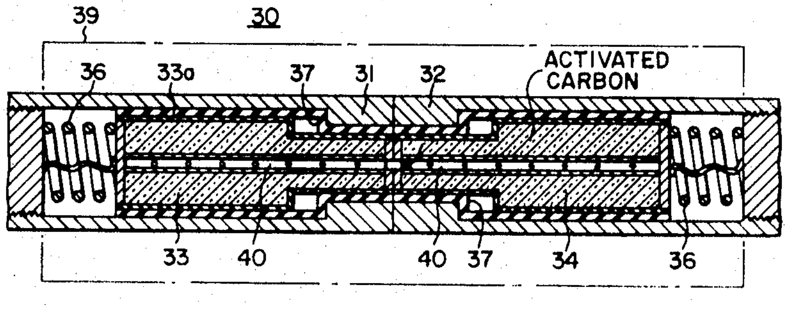
FIG. 5 illustrates a fragmentary portion of the contact structure of a circuit interrupter utilizing treated activated carbon as the arc-extinguishing element, the contact structure being illustrated in the closed-circuit position, with the activated carbon shunted out of the circuit.
Figure 6:
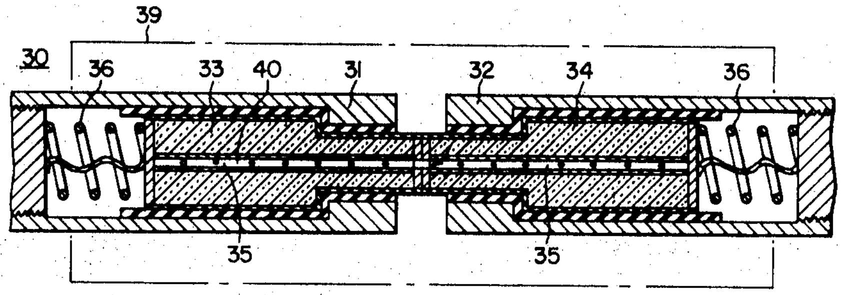
FIG. 6 is a view similar to that of FIG. 5, but illustrating the contact structure at an intermediate time in the opening operation, with the activated carbon in series circuit with the current.
Figure 7:
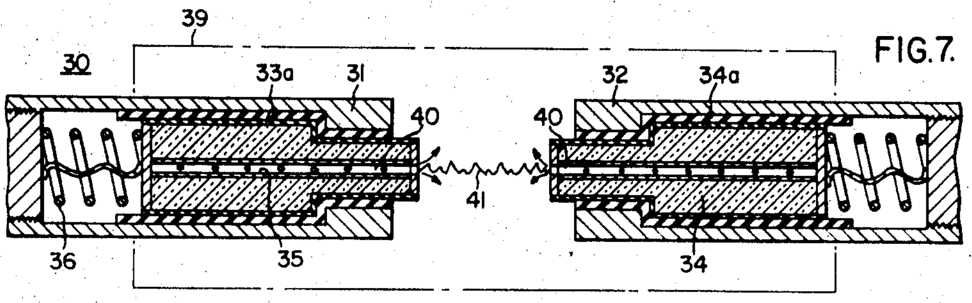
FIG. 7 is a view similar to those of FIGS. 5 and 6, but showing the contact structure in the fully open-circuit position thereof.

FIGS. 5–7 show a possible circuit-breaker construction 30 in which the arc 41 is formed between two carbon contacts which contain adsorbed $SF_6$ gas. In the closed-circuit position, the current is carried by heavy metal contacts 31, 32 which maintain the temperature cool. As the contacts 31, 32 open, as illustrated in FIG. 6, the carbon pistons 33, 34 slide maintaining contact through the carbon pieces 33, 34 for a short distance. Final opening occurs between the carbon piston ends, which are emitting the $SF_6$ gas, as shown in FIG. 7. A perforated tube 35 is provided through the center of each carbon piston 33 or 34 to permit egress of the $SF_6$ gas directly into the arc space.

Springs 36 bias the carbon pistons 33, 34 into contacting position, and shoulder portions 37 on the metallic contacts 31, 32 pick up the carbon pistons 33, 34 during the opening operation, and move the same in opposite directions, as shown more clearly in FIG. 7. Preferably insulating linears **33*a*, 34*a* are provided to contain the activated carbon mass. A suitable housing 39**, diagrammatically indicated, contains $SF_6$ gas at one atmosphere pressure in the non-operating condition.

In the closed-circuit position, as shown in FIG. 5, the main contacts 31, 32 abut and bypass the current around the activated carbon pistons 33, 34. The latter hence, are not subjected to heating in the closed-circuit position of the device. During the opening operation, the main contacts 31, 32 first separate; and the compression springs 36 bias the pistons 33, 34 into abutting engagement to continue to carry the current. The heat generated by the passage of current through the piston contacts 33, 34 evolves gas from the activated carbon, and this gas flows through the bores 40 of the perforated tubes 35 into the arcing region to extinguish the arc 41.

A modified-type circuit-interrupting construction 44 is illustrated in FIGS. 8 and 9 of the drawings. Here, it will be seen that an activated carbon shield 45 is used to confine the arc 46 drawn between the contacts 47, 48. The conducting shield 45 may be fabricated out of the activated carbon, and the arc 46 plays upon the activated carbon of the shield 45 which contains the $SF_6$ gas.

Again, a housing 49 is diagrammatically indicated to contain an atmosphere of $SF_6$ gas. The device functions to establish the arc 46 upon separation of the metallic contacts 47, 48. The heat of the arc 46 evolves $SF_6$ gas from the activated carbon shield 45, which evolved gas enters the arcing region 50, as indicated by the arrows 51, to extinguish the arc 46. Upon extinction and cooling of the shield 45, the latter readsorbs the $SF_6$ gas.

FIGS. 9A and 9B show vertical sectional views through a modified-type circuit-interrupting device, generally designated by the reference numeral 51. Two movable contacts 152, 153 abut in the closed-circuit position, as shown in FIG. 9A. An activated carbon cylinder 52 is disposed between an outer confining closed insulating sleeve **52*a* and an inner perforated sleeve 52*b*. During the opening operation, the abutting movable contacts 152, 153 separate to draw the arc 46, and the heat of the arc 46 will cause the $SF_6$ gas to be evolved from the activated carbon, which may be in granular form. This evolved gas will pass through the perforations 52*c* and into the arcing region to extinguish the arc 46. The gas may then be vented out of the bores 41 of the movable contacts 152, 153. If desired, an outer enclosure 49** may be provided.

FIGS. 10 and 11 show a modified-type of contact construction 53 in which the activated carbon normally does not carry the current of the breaker, but does when the breaker is opened. In this case, the current again heats the activated carbon and $SF_6$ gas will be desorbed. The heat of desorption also would help to cool the arc.

As shown in FIGS. 10 and 11, a pair of movable contacts 54, 55 make abutting engagement in the closed-circuit position, as shown in FIG. 10. An insulating member 56, carried by movable contact 54, blocks current flow through the activated carbon cartridge 57 in the closed-circuit position. During the opening operation, as shown in FIG. 11, the insulating member 56 blocks current flow through the bypassing conductor 58 and forces current flow through the carbon cartridge 57. The evolved $SF_6$ gas flows through the injector tube 59 and enters the arcing region 60, where extinction of the drawn arc 61 occurs.

The cartridge 57 preferably comprises an insulating tube 61 and end conducting plates 62, 63, as shown. The line connections $L_1$, $L_2$ are indicated. To assist in more effectively directing the gas from the injector tube 59 into the arc 61, an insulating confining tube 64 is provided.

There are many other arrangements and ways which may be used to switch the current from the conducting rod contacts to the activated carbon rod at the time of circuit interruption. For example, referring to FIG. 12 of the drawings, there is illustrated a movable contact 68 having a conducting flange portion 69 making contacting engagement with a relatively stationary hollow rod contact 70. Surrounding the hollow rod contact 70 is positioned a cylindrical activated carbon cartridge 71. One or more compression springs 72 bear upon the flange portion 69 of movable rod contact 68, and bias the latter in a rightward opening direction, as viewed in FIG. 12. During the opening operation, the movable rod-shaped contact 68 separates from the relatively stationary hollow rod-shaped contact 70, and the arcing current is thereby compelled to pass through the activated carbon cartridge 71 evolving $SF_6$ gas therefrom. In more detail, the current flows through stationary contact 70, end plate 65, activated carbon cartridge 71, end plate 66, springs 72 to arcing plate 74. The current then passes through arc 67 to flange portion 69 of movable contact 68. The evolved gas passes into the arcing region 73 through the hollow contact 70 and extinguishes the arc 67, which is ultimately drawn between the contact and arcing plate 74 and the flange portion 69 of movable rod contact 68.

Still an additional contact construction is illustrated in FIG. 13 of the drawings. Here, there is provided a conducting movable block 80 biased by a spring 81 against a carbon cartridge 82 positioned in a recess 83 provided in a relatively stationary contact 84. During the opening operation, the movable contact 85 separates, as at 86, from the contacting face of movable contact 84. When this occurs, the current is carried by way of the carbon cartridge 82, which evolves gas; and the evolved gas is utilized to extinguish the arc drawn between the outer face **80*a* of contact block 80 and the confronting face 82*a* of the activated carbon cartridge 82**.

FIGS. 14–16 show the application of the present invention, as applied to a commercial load-break disconnecting switch, generally designated by the reference numeral 91. As well known by those skilled in the art, the disconnecting switch 91 comprises jaw contacts 92 cooperable with the end 93 of a swinging movable disconnecting switch blade 94. Terminals 95, 96 electrically connect the switch 91 into the external circuit.

During the opening operation, a suitable mechanism disposed within a cam housing 97 causes first axial twisting of the switch blade 94 to free ice formation thereat, and to reduce contact pressure at the jaw contacts 92. Subsequently, the switch blade 94 swings in a clockwise direction, as viewed in FIG. 14, to the fully open-circuit position, indicated by the dotted lines 98.

Upon separation of the end 93 of the switch blade 94 from the jaws 92 of the disconnecting switch 91, the electrical circuit will pass through an interrupting assembly 99 and through an upper terminal 100 to an auxiliary contact arm 101. As set forth more in detail in U.S. Patent 2,911,506 issued Nov. 3, 1959, to James B. Owens, the disconnecting switch blade 94 first engages and rotates mechanism arm 90, to open the contacts of the interrupting assembly 99, and then picks up the contact auxiliary arm 101 at the end of the opening operation.

As shown more clearly in FIG. 15 of the drawings, the interrupting assembly 99 includes a movable contact rod 102, cooperable with a relatively stationary hollow contact 103, and actuated by an overcenter spring mechanism, generally designated by the reference numeral 104. The details of the overcenter spring mechanism 104 are not essential to an understanding of the present invention, and reference may be made to U.S. Patent 2,911,506 for a detailed description of their component parts.

Two concentric insulating tubes **99*a*, 99*b* retain the activated carbon. Annular conducting end rings 99*c*, 99*d*, together with a conducting tube 106, carry the current through the activated carbon when the interrupter 99 is inserted into the circuit, as well understood by those skilled in the art. For the purpose of understanding the present invention, however, it is only necessary to know that upward opening movement of the movable rod-shaped contact 102, as illustrated in FIG. 16, transfers the current through the activated carbon cartridge 79 and results in evolved $SF_6$ gas from the carbon 79 passing through a gas-conducting tube 106 and through the bore 107 of the relatively stationary contact 103 into the arcing region to effect arc extinction. Preferably an insulating housing 108** encloses the component parts of the interrupter and directs gas flow. For higher voltage units, a series arrangement of similar units may be used.

FIGS. 17 and 18 illustrate a modified-type of circuit-interrupter construction 121 in which the activated carbon not only provides a blast of $SF_6$ gas, but also generates sufficient pressure to effect opening of a movable contact 122.

In more detail, there is provided an elongated cylindrical insulating casing 125 attached to metallic flange rings 134, 135, which, in turn, are secured by a plurality of machine bolts 136 to terminal end closure plates 137, 138, to which line connections are made. The movable contact 122 is pressure operated and is guided in an insulating guide sleeve 139, which is secured interiorly of a stationary insulating enclosure cylinder 140, the latter defining a pressure chamber 129.

As shown in FIGS. 17 and 18, the pressure chamber cylinder 140 is affixed to a perforated metallic stationary contact plate 142 at one end, and to a metallic closure plate 144 at the other end. Two small pressure-equalizing holes 127, say, for example, of 5 mil size, are provided through the closure plate 144 to prevent contact separation merely because of ambient temperature changes.

Sulfur-hexafluoride (SF) gas at substantially atmospheric pressure is present within the casing 125. This is equivalent to 14.6 p.s.i. absolute pressure of $SF_6$ gas. As shown, the movable contact 122 is secured to a collar 123 which, in turn, is connected to a metallic bellows 124.

Activated coconut charcoal was confined by a 350 mesh stainless steel screen 149 preventing escape through the holes **128*a* of the contact portion 128 of contact plate 142. In addition, a surrounding insulating tube 156 and a spring-biased contact plug 151 confined the coconut charcoal granules. The load current is used to heat the activated carbon by resistance heating and the $SF_6$, which is desorbed from the activated carbon, creates a pressure to force open the contacts. The movable contact 122 acts as a piston and the spring pressure of the bellows 124** is compressed during interruption by the gas generated from desorbing the $SF_6$ from the activated carbon.

The essential features of our design improvement are: (1) use of a bellows in place of the suggested coil spring, which bellows provide a better pressure isolation of the two sides of the contact piston, and (2) incorporation of a very small leak hole connecting between the chambers on either side of the piston to eliminate any sensitivity of the device to ambient temperature changes.

When the switch is put into the circuit carrying current, the current passes through the activated carbon, heating it. Adsorbed $SF_6$ is released from the carbon and the pressure increases. The increased pressure tends to collapse the bellows to which the movable contact is connected and the contacts open. If the resistance heating is sufficient, the pressure rise will be sufficient to open the contacts to the point of arc interruption. The bellows 124 avoids leakage as well as acts as a spring.

Another problem which is taken into account in the design is the pressure change because of ambient temperature changes. This problem is solved by adding a ballast chamber on the other side of the bellows and piston from the carbon adsorber and by interconnecting the ballast volume to the volume which contains the contacts by means of a small diameter hole. The rapid pressure changes which occur when current passes through the carbon cannot be transmitted instantaneously through the small hole and interruption can still occur. Slow, secular pressure changes can be readily equalized through the small hole and the switch does not open because of slow thermal changes. As mentioned, the closure plate 144 has one or more holes 127 to prevent opening of the contacts 122, 128 during relatively slow heating conditions. When, however, surge of current is caused to pass through the circuit interrupter 121, the sudden generation of pressure within the region 129, as caused by the sudden evolution of $SF_6$ gas from the cartridge 131, will quickly effect opening of the contacts, as shown in FIG. 18. The device 121 may hence act as a protective device in a circuit to open on heavy load or fault-current interruption. It may also be used as a normally by-passed element in a load-break switch, like the device 91 of FIG. 14.

Certain details of the construction of FIGS. 17 and 18 for ambient temperature compensation are set forth and claimed in United States patent application, filed February 28, 1966, S.N. 530,513 now U.S. Patent 3,356,808, issued December 5, 1967, to Thomas W. Dakin, Daniel Berg and Donald G. Martin, and assigned to the assignee of the instant invention.

United States patent application, Serial No. 501,361, filed October 22, 1965, by Robert G. Colclaser, Jr., and Frank L. Reese entitled "Circuit Interrupter of the Gaseous Puffer-Type Having Series High-Current Explosion Chamber With Series-Connected Activated Carbon Therein" describes a circuit interrupter of the two-break type having an explosion chamber adjacent one break and a mechanically-actuated puffer, or piston device disposed at the other series break for interrupting low-value currents. Also, a copending patent application filed October 22, 1965, Serial No. 501,137, by Earl F. Beach describes a circuit interrupter provided with an explosion chamber having a restricted orifice outlet. A moving contact rod, movable through the restricted outlet, confines generated gas therein evolved from an activated carbon material, which is conductive and conducts the line current during a portion of the opening operation. The Beach structure is applied specifically to a load-break disconnecting switch.

FIG. 19 is a graph of cycles to open the circuit as a function of the current in amperes passing through the switch 121. This also demonstrates that substantial pressures of $SF_6$ can be generated by current heating of the carbon in a cycle or two of 60-cycles.

With reference to FIGS. 20 and 21 of the drawings, it will be noted that an experimental set-up, generally designated by the reference numeral 181, was provided to show data concerning the quantity of gas released in liters (S.T.P.) as a function of current input and duration of current cycles for design purposes. The carbon cartridge 183 was provided with annular end rings 184, 185 of a suitable conducting material, such as brass. The activated carbon was provided within a space 187 defined by a pair of concentric insulating tubes 188, 189, both of which were perforated, as by a multiplicity of holes 190.

With reference to FIG. 20 of the drawings, it will be noted that a glass tube 192 contained the cartridge 183 and conducting rods 195, 196 carried the current through the activated carbon cartridge 183. The conducting rod 195 was electrically connected to the metallic end ring 184, whereas the conducting rod 196 was electrically connected by a flexible connector 200 to the end ring 185. A pressure gauge 201 and a pressure telemeter 202 were provided. A valve control inlet 203 was additionally provided to transmit $SF_6$ gas into the interior 204 of the experimental set-up 181.

The following table indicates the experimental results.

TESTS OF $SF_6$ EVOLUTION FROM ACTIVATED CARBON CARTRIDGE BY RESISTANCE HEATING WITH CURRENT PULSES

| Average current, amps | Initial resistance | Duration of current cycles | Watt-seconds input | Pressure rise atmospheres | Quantity of gas released (S.T.P.) liters | Liters of gas released per kilowatt-second |
|---|---|---|---|---|---|---|
| 206 | 0.371 | 7¼ | 1,890 | 0.187 | 0.30 | 0.159 |
| 203 | 0.382 | 6¾ | 1,740 | 0.19 | 0.30 | 0.175 |
| 274 | 0.286 | 7¼ | 2,520 | 0.466 | 0.725 | 0.288 |
| 274 | 0.287 | 10¼ | 3,490 | 0.625 | 0.96 | 0.275 |
| 276 | 0.369 | 14¼ | 6,420 | 0.875 | 1.32 | 0.206 |
| 521 | 0.313 | 14¼ | 18,300 | 2.53 | 3.24 | 0.177 |
| 522 | 0.312 | 13¾ | 17,500 | 2.13 | 2.79 | 0.159 |
| 638 | 0.314 | 14¼ | 26,600 | 2.57 | 3.29 | 0.124 |
| 653 | 0.291 | 14¼ | 26,400 | 2.94 | 3.62 | 0.137 |
| 861 | 0.280 | 14¼ | 40,600 | 3.45 | 4.13 | 0.102 |

From the foregoing description of the invention, it will be apparent that there has been provided novel forms of circuit-interrupting devices utilizing the characteristics of activated carbon adsorbing arc-extinguishing gases, and causing their evolution during heating, such as by-passing current through the activated carbon.

Although there has been illustrated and described specific structures, it is to be clearly understood that the same were merely for the purpose of illustration, and that changes and modifications may readily be made therein by those skilled in the art, without departing from the spirit and scope of the invention.

We claim as our invention:

1. A circuit-interrupting device including, in combination:

(a) casing means for confining an arc-extinguishing gas;

(b) means for establishing an arc interiorly of said confined casing means;

(c) a body of activated carbon disposed within said casing means for adsorbing a quantity of the arc-extinguishing gas;

(d) means preventing current flow through said body of activated carbon in the closed or non-interrupting state of said circuit-interrupting device;

(e) means defining a main current path through the device in the closed position thereof;

(f) means for transferring a sufficient amount of the series current through the device from said main current path through the body of activated carbon during the opening operation of the device, whereby to evolve gas therefrom due to the heating thereof;

(g) means for directing the evolved gas emitted from said body into the established arc to effect the extinction thereof; and, (h) the body of activated carbon not coming into contact with the direct arcing.

2. The circuit-interrupting device of claim 1, wherein the arc-extinguishing gas is an electronegative gas and is selected from the group consisting of sulfur hexafluoride, selenium hexafluoride and trifluoromethyl sulfur pentafluoride.

3. The circuit-interrupting device of claim 1, wherein the transferring means comprises a pair of separable contacts biased into contacting engagement and having the body of activated carbon carried therewith.

4. In an electrical switch, in combination:
(a) a main switch blade (94);
(b) a main contact member (92) engaged by the main switch blade;
(c) operating means for disengaging the main switch blade from the main contact member;
(d) an auxiliary switch blade (101) actuated by the main switch blade (94);
(e) an auxiliary contact member (100) engaged by the auxiliary blade (101);
(f) an interrupting device (99) connected to the main contact member (92);
(g) said interrupting device (99) including:
 (i) casing means for confining an arc-extinguishing gas;
 (ii) contact means including a movable contact rod (102) for establishing an arc interiorly of said confined casing means;
 (iii) a body of activated carbon disposed within said casing means for adsorbing a quantity of the arc-extinguishing gas;
 (iv) means preventing current flow through said body of activated carbon in the closed or non-interrupting state of said electrical switch;
 (v) means defining a main current path through the switch in the closed position thereof;
 (vi) means for transferring a sufficient amount of the series current through the switch from said main current path through the body of activated carbon during the opening operation of the switch, whereby to evolve gas therefrom due to the heating thereof;
 (vii) means for directing the evolved gas emitted from said body into the established arc to effect the extinction thereof;
 (viii) the body of activated carbon not coming into contact with the direct arcing,
(h) said auxiliary contact member (100) being attached to the interrupting device (99); and,
(j) an actuating mechanism operated by the main switch blade (94) for separating the contact means within the interrupting device (99) to draw an arc within the interrupting device after the main switch blade (94) has been disengaged from the main contact member (92).

5. A lightning arrester including, in combination:
(a) spark-gap means for establishing an arc during discharge operation of the lightning arrester;
(b) casing means for enclosing the spark-gap means;
(c) a body of activated carbon disposed within said casing means for adsorbing a quantity of arc-extinguishing gas;
(d) said body of activated carbon being in electrical series circuit with the discharge path through the lightning arrester, whereby to evolve gas therefrom due to the heating thereof;
(e) means for directing the evolved gas emitted from said body of activated carbon into the established arc to effect the extinction thereof; and,
(f) the body of activated carbon not coming into direct contact with the arcing discharge.

6. The lightning arrester combination of claim 5, wherein the body of activated carbon comprises two spaced discs (2, 3), and the directing means comprises a generally T-shaped conduit means (5, *5a*, *5b*).

7. The lightning arrester combination of claim 5, wherein the arc-extinguishing gas is an electronegative gas.

8. The lightning arrester combination of claim 7, wherein the electronegative gas is sulfur-hexafluoride ($SF_6$) gas.

9. The lightning arrester combination of claim 5, wherein the spark-gap means comprises a pair of spaced electrode plates (13, 14) having formed upstanding annular ridges (**13*a*, 14*a*) confronting each other to provide an annular sparking area (18**).

10. The lightning arrester combination of claim 9, wherein a radial field magnet (15) is provided to cause spinning of the established arc during arrester operation.

11. The lightning arrester combination of claim 5, wherein a confining casing (23) of cellulosic fiber material is provided.

12. The combination of claim 11, wherein the body of activated carbon comprises two spaced end pieces (21, 22).

13. The lightning arrester combination of claim 12, wherein a conducting shield (28) is provided.

14. The combination of claim 1, wherein the means for establishing an arc comprises a movable contact rod (54) having a member (56) of insulation secured thereto and movable therewith, and said member (56) being in close proximity to the body of activated carbon in the closed-circuit position of the device.

15. The combination of claim 1, wherein the arc-establishing means comprises a main pair of separable contacts and a pair of separable arcing contacts, and the body of activated carbon is in electrical series with the separable arcing contacts.

References Cited

UNITED STATES PATENTS

| | | | |
|---|---|---|---|
| 3,021,409 | 2/1962 | Cobine et al. | |
| 3,122,728 | 2/1964 | Lindberg. | |
| 3,356,808 | 12/1967 | Dakin et al. | 200—140 |

FOREIGN PATENTS

| | | |
|---|---|---|
| 1,154,548 | 9/1963 | Germany. |
| 525,244 | 8/1940 | Great Britain. |

ROBERT S. MACON, Primary Examiner

U.S. Cl. X.R.

200—148, 149; 337—28, 34